United States Patent [19]

McMaster

[11] Patent Number: 4,725,300
[45] Date of Patent: Feb. 16, 1988

[54] GLASS SHEET HEATING SYSTEM INCLUDING CRADLED ROLL CONVEYOR

[75] Inventor: Ronald A. McMaster, Woodville, Ohio

[73] Assignee: Glasstech, Inc., Perrysburg, Ohio

[21] Appl. No.: 13,450

[22] Filed: Feb. 11, 1987

[51] Int. Cl.⁴ ............................................. C03B 35/18
[52] U.S. Cl. ...................................... 65/273; 65/163; 65/348; 65/35
[58] Field of Search ................... 65/273, 348, 350, 163

[56] References Cited

U.S. PATENT DOCUMENTS

| | | | |
|---|---|---|---|
| 1,885,306 | 11/1932 | Sylvester | 65/163 X |
| 3,792,993 | 2/1974 | Artama et al. | 65/350 X |
| 4,230,475 | 10/1980 | Dunk | 65/348 X |
| 4,341,546 | 7/1982 | Nitschke et al. | 65/350 X |
| 4,437,872 | 3/1984 | McMaster et al. | 65/273 X |

Primary Examiner—Arthur Kellogg
Attorney, Agent, or Firm—Brooks & Kushman

[57] ABSTRACT

A glass sheet heating system (10) is disclosed as including a cradled roll conveyor (48) incorporated with a furnace (12) having roll contacting seals (58) that directly engage conveyor rolls (60) to prevent heat loss from the furnace. Each roll contacting seal (58) preferably includes a pair of rigid refractory seal holders (64,66) and a pair of soft blanket seals (68,70) made of refractory fibers. Sets of cradle rolls (72) on each side of the furnace have high traction drive elements (78) and cooperate in pairs to rotatably support the conveyor rolls (60) in planarity with each othe to convey glass sheets. A drive mechanism (80) provides driving of the cradle rolls 72 with sufficient friction to overcome the friction generated between the roll contacting seals (58) and the conveyor rolls (60). The drive mechanism (80) preferably includes an elongated drive shaft (82) extending along one side of the furnace (12) and coupled through gear units (90) to alternate cradle rolls (72) on the adjacent side of the furnace, with the other alternate cradle rolls (72) on the adjacent side of the furnace and the other set of cradle rolls on the other side functioning as idlers that interconnect the conveyor rolls (60) for synchronous driving.

14 Claims, 9 Drawing Figures

GLASS SHEET HEATING SYSTEM INCLUDING CRADLED ROLL CONVEYOR

TECHNICAL FIELD

This invention relates to a glass sheet heating system including an improved cradled roll conveyor for conveying glass sheets during heating.

BACKGROUND ART

Glass sheet heating such as is necessary for tempering was primarily conducted for many years in the past by the "vertical" process wherein tongs are utilized to suspend the glass sheet for conveyance through a furnace in which the heating is performed. One problem with the vertical process is that the tongs tend to leave marks in the glass. Another problem with the vertical process is that the suspended glass sheet upon softening tends to distort due to its own weight and thereby loses optical quality.

Another type of glass sheet heating system developed in the 1960's is the gas hearth type wherein glass sheets are conveyed over a thin film of gas supplied through a lower hearth having a planar surface with a slight tilt. At the lower side of the tilted hearth, a conveyor engaged with the edge of the glass is provided in order to move the glass during the heating. While gas hearth conveyors have been used for many years, the cost involved to operate such systems is significant and thus not totally satisfactory.

While there is prior art disclosing the use of roller conveyors for glass sheet heating during tempering, there was no significant commercial acceptance of roller conveyors for glass sheet tempering furnaces before the 1970's. This was due to problems involved in maintaining planarity of the conveyed glass sheets and uniformity in roll driving so as not to mar the conveyed glass surfaces.

In the early 1970's, glass sheet tempering systems having roller conveyors with friction drives were introduced into the glass tempering industry and received immediate recognition that has since resulted in such systems being used throughout the world. That type of friction drive roller conveyor for use in glass sheet heating is disclosed by the U.S. Pat. No. 3,806,312 of McMaster and Nitschke. The system involved includes a horizontal roller conveyor having rolls on which the glass sheets are conveyed during the heating. The rolls of the conveyor span the gap between a pair of spaced horizontally extending surfaces over which driving reaches of a pair of continuous drive loops are respectively moved to support and frictionally drive the ends of the rolls. Both support surfaces are located within the heating chamber of the furnace and the drive loops utilized are solid steel belts which can withstand the high temperature present upon passage through the heating chamber. During operation of this drive mechanism, the driving reaches of the continuous drive loops are maintained taut so as to maintain the upper surfaces of the rolls in a single plane along which the glass sheets are conveyed over the rolls. Also, a coupling between a pair of drive sheaves that respectively drive the pair of continuous drive loops at one end of the system and adjustable supports for each of the sheaves provide coordinated driving thereof in a manner that ensures conveyance of the glass sheets in the direction intended with minimal lateral drift.

A second generation of glass tempering systems having frictionally driven roller conveyors was subsequently developed as disclosed by the U.S. Pat. Nos. 3,934,970 and 3,947,242 of McMaster and Nitschke. This second generation included a furnace whose roller conveyor has the basic type of frictional drive mechanism discussed above but with ends of the conveyor rolls projecting outwardly through side slots defined between side walls of upper and lower housing portions of the furnace. The continuous drive loops of the drive mechanism are driven over external support surfaces to support and frictionally drive the roll ends and thus operate at a much lower temperature than is the case when located within the heating chamber. The lower temperature involved with this external location facilitates the use of continuous chains for the drive loops as opposed to the solid steel belts that are utilized when the drive loops pass through the heating chamber. These chains have teeth that permit positive driving thereof by toothed sheaves associated therewith as opposed to depending on frictional wrap force about the sheaves as with the solid steel belts. Also, the chains can bend to a much smaller radius of curvature than the solid steel belts and thereby permit the use of smaller diameter sheaves.

Each of the glass sheet tempering systems described above with the frictionally driven roller conveyors was initially manufactured as the continuous type wherein the glass is conveyed in a single direction throughout its heating. Such continuous systems have substantial output that may be greater than needed for any particular factory installation, especially if the width of the conveyor is sufficiently wide to handle the large size glass that has found widespread use in the recent past for architectural purposes.

Another glass tempering system as disclosed by the U.S. Pat. No. 3,994,711 of McMaster was introduced after the systems described above and had the same friction drive mechanism but with the conveyor of the furnace driven in an oscillatory manner so as to oscillate a glass sheet or sheets being heated independently of a roller conveyor of the associated quench unit where the glass is subsequently tempered. During an index cycle, the furnace and quench unit conveyors are coupled to provide coordinated conveyance of a heated glass sheet or sheets from the furnace into the quench unit. A first electric motor drive mechanism of this system drives a roller conveyor of a load station as well as the roller conveyor of the furnace while a second electric motor drive mechanism drives a roller conveyor of an unload station as well as the roller conveyor of the quench unit. During oscillatory driving of glass being heated within the furnace and independent oscillation of glass being cooled within the quench unit, the roller conveyors of the load and unload stations are respectively uncoupled from the first and second electric motor drive mechanisms so as to permit loading of glass to be tempered at the load station and unloading of tempered glass at the unload station. The oscillatory driving of the furnace roller conveyor considerably shortens the length of the total system while still conveying the heated glass sufficiently fast to prevent sagging thereof between the spaced rolls of the conveyor.

Other glass sheet heating conveyors of the frictionally driven roller type are disclosed by U.S. Pat. Nos.: 4,133,667; 4,233,053; 4,341,546; 4,356,912; and 4,512,460.

Frictional driving of glass sheet roller conveyors has also been accomplished as disclosed by U.S. Pat. No. 4,617,043 with an endless belt that is pressed by spring loaded rolls against the ends of the furnace rolls. As disclosed by U.S. Pat. Nos. 4,297,121 and 4,300,937, glass sheet heating conveyors of the frictionally driven roller type have also utilized an endless loop that is movable over support rollers and on which the conveyor rolls are supported with resilient sleeves on the conveyor roll ends for reducing vibration.

As disclosed by U.S. Pat. No. 4,332,608, glass sheet heating systems have also been constructed with cradled roll conveyors wherein support rolls cooperate in pairs to support and frictionally drive opposite ends of conveyor rolls on which the glass sheets are conveyed during the heating. Such frictional driving has also previously utilized O-rings that increase the friction generated to provide the roll driving.

DISCLOSURE OF INVENTION

An object of the present invention is to provide a glass sheet heating system having a frictionally driven roll conveyor for conveying glass sheets through a furnace housing that is sealed to prevent heat loss and thermal distortion of conveyed glass sheets due to ambient air entering the furnace.

In carrying out the above object and other objects of the invention, the glass sheet heating system of the invention includes a furnace having a housing defining a heating chamber that can be heated in any suitable manner such as by electric resistant elements or gas burners. This housing includes laterally spaced side walls having associated roll contacting seals. A cradled roll conveyor of the system includes conveying rolls that extend laterally through the heating chamber and have ends projecting outwardly from the housing through the roll seals of the side walls with the roll seals directly engaging the rolls adjacent the ends thereof to prevent heat loss from the furnace. This cradled roll conveyor also includes sets of cradle rolls spaced along each side of the furnace externally of its side walls. The cradle rolls have high traction drive elements and cooperate in pairs to rotatably support the ends of the conveyor rolls in planarity with each other for conveyance of glass sheets. A drive mechanism of the system on one side of the furnace rotatively drives the adjacent set of cradle rolls and the conveyor rolls supported on the high traction drive elements of the cradle rolls for synchronous driving.

The roll contacting seals that directly engage the conveyor rolls prevent heat loss from the furnace and distortion of conveyed glass sheets by relatively cold ambient air entering the furnace heating chamber. Nevertheless, the conveyance is still possible with frictional driving by virtue of the cradle rolls and high traction drive elements thereof that provide a relatively high traction in the driving of the conveyor rolls. Also, the high traction drive elements support the ends of the conveyor rolls, which are made of ceramic material such as fused silica, without producing any wear. As such, no steel end caps for the conveyor rolls are necessary as is the case when belts or chains are used to provide the frictional driving.

In the preferred construction, the drive mechanism includes an elongated shaft that extends along the one side of the furnace to rotatively drive the adjacent set of cradle rolls. A plurality of gear units of the drive mechanism are rotatively driven by the drive shaft and respectively coupled to alternate cradle rolls of the one adjacent set to provide rotational driving thereof that drives the conveyor rolls. The other alternate rolls of the adjacent set of cradle rolls and the other set of cradle rolls function as idlers that interconnect the conveyor rolls for synchronous driving to provide glass sheet conveyance without any differential rotation between the rolls in a manner that could cause marking or scuffing of the conveyed glass surfaces in their softened condition upon heating.

Each roll contacting seal preferably includes a pair of rigid refractory seal holders mounted by the associated furnace side walls. A pair of soft blanket seals of each roll contacting seal are made of refractory fibers and are positioned by the pair of holders thereof in sealed engagement with the conveyor rolls.

Preferably, the glass sheet heating system also includes a pair of vertical plates that are respectively located on opposite sides of the furnace with the cradle rolls rotatably supported on the inboard sides of the plates. At the one side of the furnace, the gear units are supported on the outboard side of the adjacent vertical plate and are connected to the associated cradle rolls to provide the rotational driving. Antifriction bearings are preferably utilized to rotatively support the cradle rolls on the vertical plates by associated shafts.

A framework of the system is disclosed as having a support member associated with each vertical plate, and an adjustable connector is also provided for supporting each vertical plate on the associated support member to provide adjustment of the plane of conveyance in order to maintain planarity of different conveyor sections of the system. Each adjustable connector preferably includes threaded bolts for providing both horizontal and vertical adjustment of the associated vertical plate.

At the ends of the conveyor rolls, central end bumpers are also provided for engaging the vertical plates to provide axial positioning of the conveyor rolls. Such axial positioning in cooperation with the longitudinal and vertical positioning provided by the high traction drive elements of the cradle rolls accurately locates the conveyor rolls in all directions to provide conveyance along a single plane without any lateral drift that could cause marking or scuffing of the softened glass sheet upon heating.

As disclosed, the glass sheet heating system includes a main conveyor associated with the cradled roll conveyor. During use, the cradled roll conveyor functions as an index station that is capable of driving with relatively high acceleration and deceleration by virtue of the high traction drive elements of the cradle rolls despite the friction generated by the roll seals that prevent heat loss from the furnace.

The objects, features, and advantages of the present invention are readily apparent from the following detailed description of the best mode for carrying out the invention when taken in connection with the accompanying drawings.

BEST MODE FOR CARRYING OUT THE INVENTION

Figure 1:
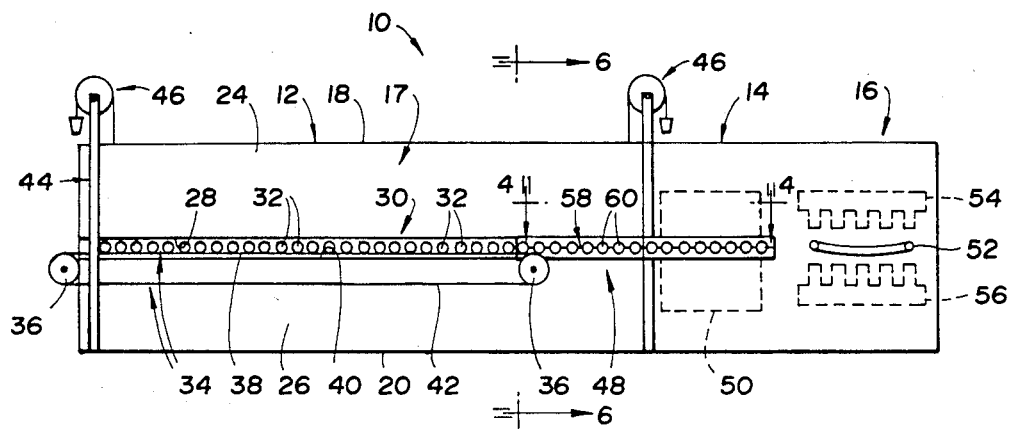
FIG. 1 is a schematic side elevational view of a glass sheet heating system constructed in accordance with the present invention.
Figure 6:
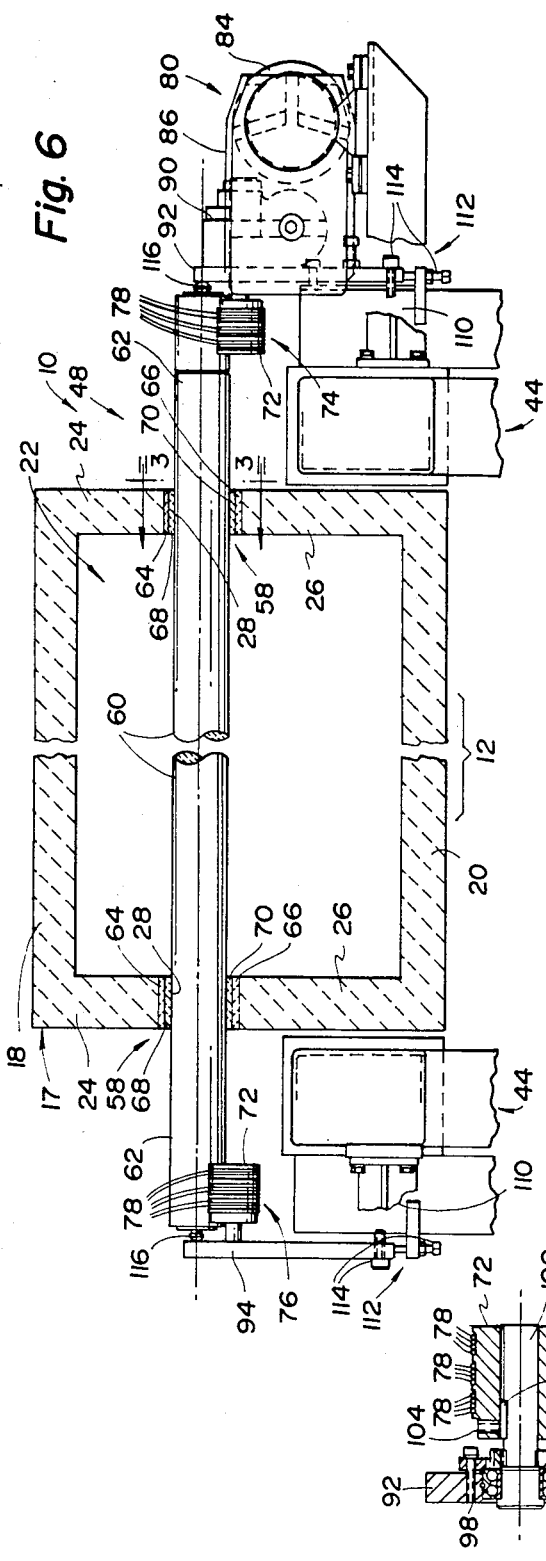
FIG. 6 is a cross-sectional view taken through the system along the direction of line 6—6 in FIG. 1.

With reference to FIG. 1 of the drawings, a glass sheet heating system constructed in accordance with the invention is generally indicated by 10 and includes a furnace 12 for heating glass sheets as is hereinafter more fully described. System 10 is also disclosed as including a processing station such as a bending station 14 and a quench station 16 for quenching the bent glass sheets. The furnace 12 includes a housing 17 having upper and lower housing portions 18 and 20 that define a heating chamber 22 as shown in FIG. 6. Upper and lower side walls 24 and 26 of the upper and lower housing portions define side slots 28 that extend longitudinally along the length of the furnace at each of its sides. A main conveyor 30 of the furnace is of the frictionally driven type including conveyor rolls 32 that extend through the furnace heating chamber and have opposite ends projecting outwardly through the side slots 28. A continuous drive loop 34 such as a chain is associated with each side of the furnace and extends over sprockets 36. Each drive loop 34 has a driving reach 38 that is movable over a support surface 40 at the adjacent side of the furnace, while a return reach 42 extends between the sprockets 36 below the support surface 40. Driving of the left sprocket 36 in a counterclockwise direction pulls the driving reach 38 over the support surface 40 to rotate the conveyor rolls 42 clockwise. These conveyor rolls have suitable end pins that are captured by fixed vertical slots provided adjacent the support surface 40 so as to prevent longitudinal movement such that the driving reach 38 rotates the conveyor rolls 32 clockwise to convey a glass sheet supported thereby toward the right. It is also possible to reverse the direction of glass sheet conveyance by rotating the right sprocket 36 clockwise in order to provide an oscillation of the glass sheet being heated if such is desired.

As shown by continued reference to FIG. 1, a framework 44 of the system is provided with a counter-balance mechanism 46 that is connected to each corner of the upper housing portion 20 to permit upward vertical movement thereof that allows access into the interior of the furnace when necessary for maintenance or repair. This counter-balance mechanism 46 is constructed so as to maintain the upper housing portion raised even if the connection to one of the corners is broken.

A cradled roll conveyor 48 of the system is illustrated as functioning as an index conveyor that conveys heated glass sheets from the furnace 12 adjacent its right end to a bending mechanism 50 of the bending station 14. This is one use for which the cradled roll conveyor 48 of the invention has particular utility as a result of the high traction that is achieved in its driving as is hereinafter more fully described. However, it should be appreciated that the construction of the cradled roll conveyor 48 can also be utilized for the entire length of the system as well as for providing the indexing as is herein specifically discussed.

After conveyance of the glass sheet to the bending station 14 and bending thereof by the bending mechanism 50, a suitable transfer ring 52 is moved from the quench station 16 to the bending station 14 to receive the bent glass sheet and is then moved back to the quench station where upper and lower blastheads 54 and 56 provide quenching gas that tempers the bent glass sheet.

In addition to appreciating that the cradled roll conveyor 48 does not have to function only as an indexing conveyor, it should also be appreciated that the cradled roll conveyor can be used in other glass sheet heating systems other than the bending and tempering system 10 specifically disclosed.

Figure 3:
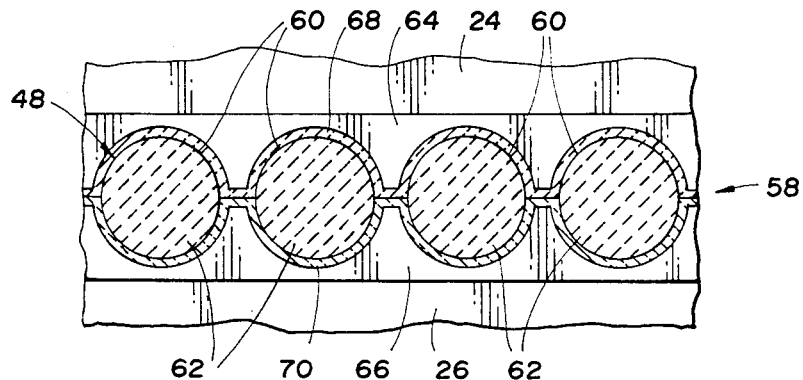
FIG. 3 is a partial sectional view taken along the direction of line 3—3 in FIG. 6 to illustrate the manner in which conveyor rolls of the conveyor extend outwardly through roll contacting seals of the furnace side walls in order to minimize heat loss.

As illustrated by combined reference to FIGS. 3 and 6, the furnace housing side walls 24 cradled roll conveyor 48. Conveyor rolls 60 of the cradled roll conveyor 48 extend laterally through the furnace heating chamber 22 as shown in FIG. 6 and have ends 62 that project outwardly from the furnace housing 17 through the roll seals 58 of the side walls. These roll seals 58 are directly engaged with the rolls adjacent the end 62 thereof to prevent heat loss from the furnace and to thus prevent relatively cool ambient air from entering the furnace and causing thermal distortion of conveyed glass sheets. The relatively tightly sealed relationship provided by the roll contacting seals 58 also prevents the upper and lower housing portions 18 and 20 from being thermally distorted by hot air that escapes from the furnace as well as maintaining the exterior of the furnace relatively cool for operator comfort.

The roll contacting seals 58 each include somewhat scalloped shaped upper and lower seal holders 64 and 66 on the upper and lower side walls 24 and 26 as shown best in FIG. 3. These seal holders 64 and 66 are made from suitable refractory fibers that are soaked with a colloidal silica that cooperates with the fibers to form a rigid structure. Each roll contacting seal 58 also includes upper and lower soft blanket seals 68 and 70 made from refractory fibers such as aluminum oxide and silicon oxide fibers. These blanket seals 68 and 70 are sufficiently soft and flexible so as to be formable to the scalloped shape spacing between the seal holders 64 and 66 and the conveyor roll ends 62. The direct contact of the soft blanket seals 68 and 70 with the conveyor rolls 60 adjacent the ends 62 thereof prevents heat loss from the furnace as previously described in order to avoid the attendant problems.

Figure 2:
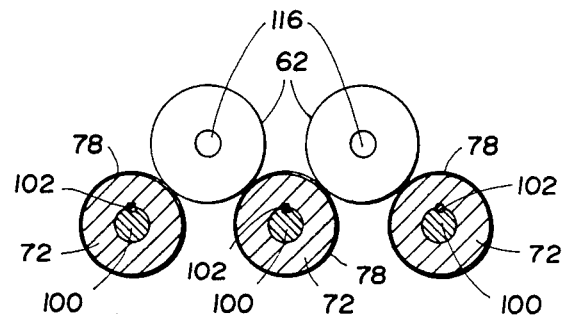
FIG. 2 is a side view taken partially in section generally along the direction of line 2—2 in FIG. 4 to illustrate a cradled roll conveyor of the system.
Figure 7:
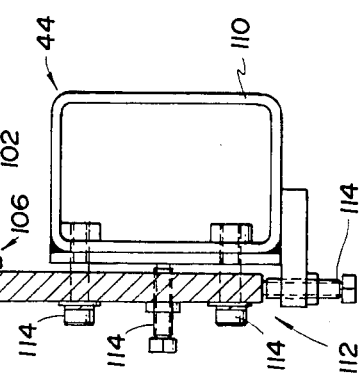
FIG. 7 is an elevational view taken partially in section along the direction of line 7—7 in FIG. 4 to illustrate the construction of idler cradle rolls of the conveyor.

As shown by combined reference to FIGS. 2 and 4 through 6, the cradled roll conveyor 48 also includes cradle rolls 72 arranged in sets 74 and 76 (FIGS. 4 and 6) at each side of the furnace externally of the associated furnace side walls 24 and 26. The cradle rolls 72 have high traction drive elements that are illustrated as being embodied by O-rings 78. Cradle rolls 72 cooperate in pairs to support and rotatively drive the ends 62 of the conveyor rolls 60 in planarity with each other, as best shown in FIG. 2, to provide conveyance of glass sheets. It should also be appreciated that the high traction drive elements can be embodied by sleeves or other constructions in addition to the O-rings 78 as long as a resilient high traction material is used. Also, the resilient high traction material used must be capable of sustaining any heat present adjacent the furnace and must not be too soft to allow any significant movement of the conveyor rolls 60 either vertically or rotationally with respect to each other since glass quality problems would then result. As illustrated, twelve O-rings 78 are used on each cradle roll in three sets of four as best shown in FIGS. 7 and 8.

A drive mechanism 80 of the system is located on one side of the furnace 12 as best shown in FIG. 6 and rotatively drives the adjacent set 74 of cradle rolls 72 to thereby also drive the conveyor roll 60 whose ends 62 are supported on the high traction drive elements embodied by the O-rings 78 of the cradle rolls.

Figure 4:
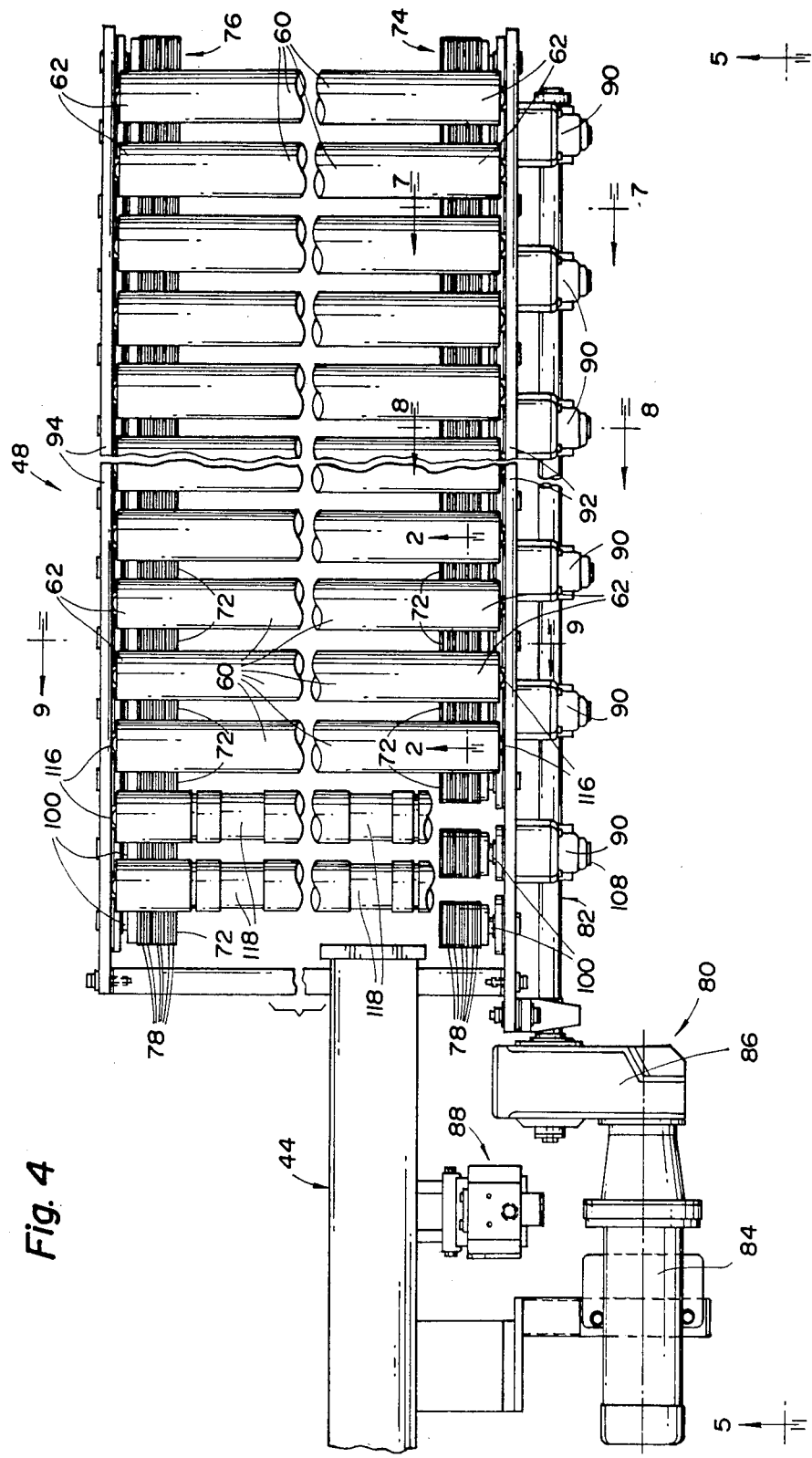
FIG. 4 is a top plan view of the cradled roll conveyor taken along the direction of line 4—4 in FIG. 1.
Figure 5:
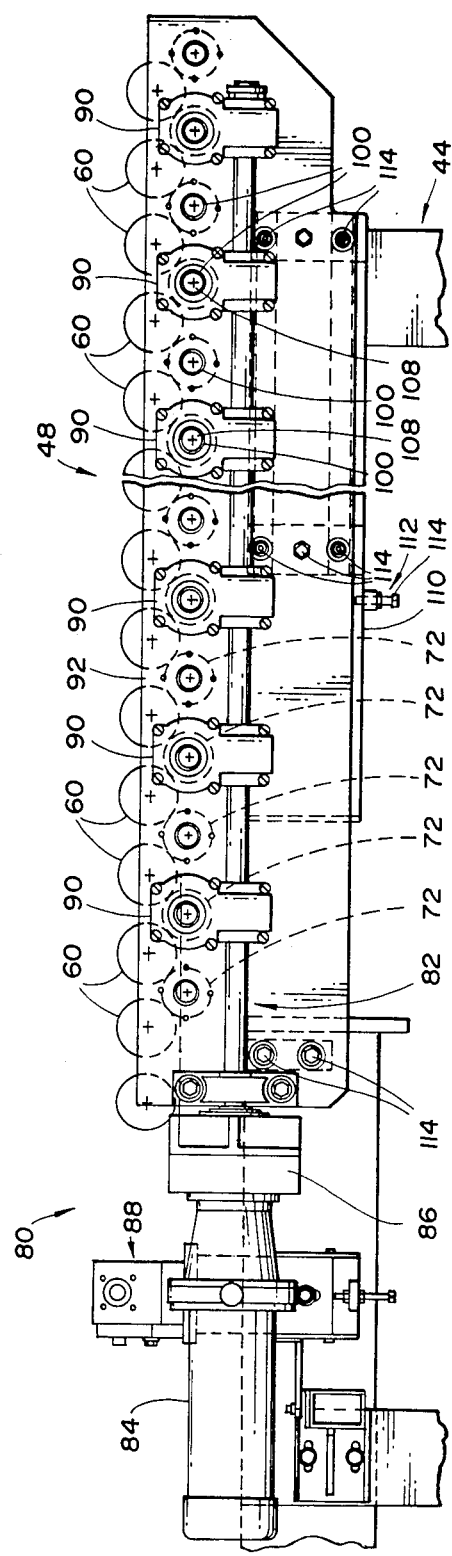
FIG. 5 is a side view of the cradled roll conveyor taken along direction of line 5—5 in FIG. 4.

As illustrated in FIGS. 4 and 5, the drive mechanism 80 preferably includes an elongated drive shaft 82 that extends along the one side of the furnace to rotatively drive the adjacent set 74 of cradle rolls 72. Adjacent one of the shaft ends as illustrated in FIG. 4, the framework 44 of the system supports an electric motor 84 that drives a reduction gear unit 86 coupled to shaft 82. An electric eye assembly 88 is also mounted on the framework 44 adjacent the electric motor 84 and is utilized to monitor the progress of conveyed glass sheets upon conveyance thereto within the furnace. Drive mechanism 80 which is located adjacent electric eye assembly 88 also includes a plurality of gear units 90 that are rotatively driven by the drive shaft 82 and respectively coupled to alternate cradle rolls 72 of the adjacent cradle roll set 74 to provide rotational driving thereof upon operation of the electric motor 84. The other alternate cradle rolls 72 of the adjacent cradle roll set 74 and the other cradle rolls 72 of the cradle roll set 76 function as idlers that support and interconnect the conveyor rolls 60 during the rotational driving.

Figure 8:
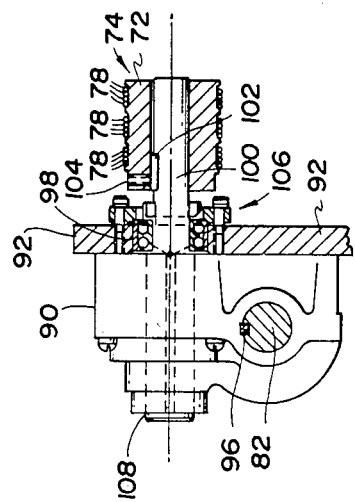
FIG. 8 is an elevational view taken partially in section along the direction of line 8—8 in FIG. 4 to illustrate the construction of drive cradle rolls of the conveyor.

As illustrated by FIGS. 4 and 6 through 9, system 10 further includes a pair of vertical plates 92 and 94 that are respectively located on opposite sides of the furnace with the cradle rolls 72 rotatably supported on the inboard sides of the plates. As shown in FIG. 8, the gear units 90 on the one side of the furnace are supported on the outboard side of the associated plate 92 with the drive shaft 82 extending therethrough and coupled thereto by a key 96. An antifriction bearing 98 associated with each cradle roll 72 provides support thereof on the associated vertical plate by way of a shaft 100 with a key 102 and lock screw 104 providing a connection of the cradle roll to the shaft. Any type of suitable mounting assembly 106 supports the shaft 100 on the inner race of the antifriction bearing 98 as well as securing the antifriction bearing 98 to the associated vertical plate. Each of the shafts 100 associated with the drive cradle rolls 72 has an extension 108 extending through the associated gear unit 90 as shown in FIG. 8. Each gear unit 90 through suitable gearing provides driving of the associated cradle roll connected thereto by its shaft 100 about an axis transverse at 90° to the drive axis of drive shaft 82. Each of the idler cradle rolls 72 as illustrated in FIG. 6 has its shaft terminating adjacent the associated antifriction bearing 98.

As illustrated by FIGS. 6 and 7, the system framework 44 includes a support member 110 associated with each vertical plate 92 and 94 at a location below the adjacent cradle roll sets 74 and 76. An adjustable connector 112 supports each vertical plate 92 and 94 on the associated support member 110 as best illustrated in FIG. 7. Each adjustable connector 112 includes threaded push-pull bolts 114 mounted with appropriate slotting to provide both horizontal and vertical adjustment of the associated vertical plate in order to maintain planarity of the conveyed glass sheets, the proper longitudinal positioning of the conveyor rolls, and the proper spacing between the plates to axially position the conveyor roll 60 as is hereinafter more fully described.

Figure 9:
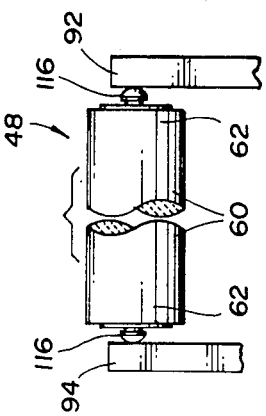
FIG. 9 is an elevational view taken along the direction of line 9—9 in FIG. 4 to illustrate the manner in which roll bumpers and vertical plates of the system provide axial positioning of the conveyor rolls.

As illustrated by combined reference to FIGS. 2, 6, and 9, each conveyor roll 60 has its ends 62 provided with central end bumpers 116 that are made from a suitable resilient material and have pin portions received by central end holes of the conveyor roll ends. These bumpers 116 engage the inboard sides of the vertical plates 92 and 94 to provide lateral positioning in a horizontal direction of the conveyor rolls 60 between the vertical plates 92 and 94. The positioning of plates 92 and 96 is adjusted horizontally by the connectors 112 previously described in connection with FIG. 7 to provide the proper spacing for preventing axial movement of the conveyor rolls along their axes of rotation. This axial positioning in cooperation with the cradle roll support completely locates the conveyor rolls against translational movement while still providing the support for roll rotation.

As shown in FIG. 4, the conveyor rolls 60 that are located closest to the main conveyor 30 shown in FIG. 1 have undercuts 118 to permit the drive loops 34 of the main conveyor to slightly overlap the cradled roll conveyor 48. This permits the transition between the conveyors to be provided with uniform roll spacing without any gap at which the heated glass sheets could sag.

While the best mode for carrying out the invention has been specifically disclosed, those familiar with the art to which this invention relates will recognize various alternative designs and embodiments for practicing the invention as defined by the following claims.

What is claimed is:

1. A glass sheet heating system comprising: a furnace including a housing defining a heating chamber; said housing including laterally spaced side walls having associated roll contacting seals; a cradled roll conveyor including conveying rolls that extend laterally through the heating chamber and have ends projecting outwardly from the housing through the roll seals of the side walls with the roll seals directly engaging the rolls adjacent the ends thereof to prevent heat loss from the furnace; said cradled roll conveyor also including sets of cradle rolls spaced along each side of the furnace externally of the side walls thereof; said cradle rolls having high traction drive elements and cooperating in pairs to rotatably support the ends of the conveyor rolls in planarity with each other for conveyance of glass sheets; and a drive mechanism on one side of the furnace for rotatively driving the adjacent set of cradle rolls and the conveyor rolls whose ends are supported on the high traction drive elements of the cradle rolls for synchronous driving.

2. A glass sheet heating system as in claim 1 wherein the drive mechanism includes an elongated drive shaft that extends along the one side of the furnace to rotatively drive the adjacent set of cradle rolls.

3. A glass sheet heating system as in claim 2 wherein the drive mechanism includes a plurality of gear units rotatively driven by the drive shaft and respectively coupled to alternate cradle rolls of said one adjacent set to provide rotational driving thereof, and the other alternate cradle rolls of the adjacent set of cradle rolls and the other set of cradle rolls functioning as idlers that interconnect the conveyor rolls during the rotational driving.

4. A glass sheet heating system as in claim 3 wherein each roll seal includes a pair of rigid refractory seal holders mounted by the associated furnace side wall, and each roll seal also including a pair of soft blanket refractory seals positioned by the holders thereof in sealed engagement with the conveyor rolls.

5. A glass sheet heating system as in claim 4 further including a pair of vertical plates that are respectively located on opposite sides of the furnace with the cradle rolls rotatably supported on inboard sides of the plates, and the gear units at the one side of the furnace being supported on the outboard side of the adjacent vertical plate.

6. A glass sheet heating system as in claim 5 which includes antifriction bearings that rotatably support the cradle rolls on the vertical plates.

7. A glass sheet heating system as in claim 5 further including a framework having a support member associated with each vertical plate, and an adjustable connector for supporting each vertical plate on the associated support member.

8. A glass sheet heating system as in claim 7 wherein each adjustable connector includes threaded bolts for providing both horizontal and vertical adjustment of the associated vertical plate.

9. A glass sheet heating system as in claim 5 wherein each conveyor roll has central end bumpers that engage the vertical plates to axially position the conveyor rolls.

10. A glass sheet heating system as in any one of claims 1 through 9 which includes a main conveyor associated with the cradled roll conveyor, and with the cradled roll conveyor functioning as an index station that is capable of driving with relatively high acceleration and deceleration by virtue of the high traction drive elements of the cradle rolls.

11. A glass sheet heating system comprising: a furnace including a housing having upper and lower housing portions defining a heating chamber; said housing including laterally spaced side walls having associated roll contacting seals; each roll contacting seal including a pair of rigid refractory seal holders and a pair of soft blanket seals that are made of refractory fibers and positioned by the seal holders; a cradled roll conveyor including conveying rolls that extend laterally through the heating chamber and have ends projecting outwardly from the housing through the roll seals of the side walls with the blanket seals of the roll seals directly engaging the rolls adjacent the ends thereof to prevent heat loss from the furnace; said cradled roll conveyor also including sets of cradle rolls spaced along each side of the furnace externally of the side walls thereof; said cradle rolls having high traction drive elements and cooperating in pairs to rotatably support the ends of the conveyor rolls in planarity with each other for conveyance of glass sheets; and a drive mechanism on one side of the furnace for rotatively driving the adjacent set of cradle rolls and the conveyor rolls whose ends are supported on the high traction drive elements of the cradle rolls for synchronous driving.

12. A glass sheet heating system comprising: a furnace including a housing having upper and lower housing portions defining a heating chamber; said housing including laterally spaced side walls having associated roll contacting seals; each roll contacting seal including a pair of rigid refractory seal holders and a pair of soft blanket seals that are made of refractory fibers and positioned by the seal holders; a cradled roll conveyor including conveying rolls that extend laterally through the heating chamber and have ends projecting outwardly from the housing through the roll seals of the side walls with the blanket seals of the roll seals directly engaging the rolls adjacent the ends thereof to prevent heat loss from the furnace; said cradled roll conveyor also including sets of cradle rolls spaced along each side of the furnace externally of the side walls thereof; said cradle rolls having high traction drive elements and cooperating in pairs to rotatably support the ends of the conveyor rolls in planarity with each other for conveyance of glass sheets; and a drive mechanism that is located on one side of the furnace and includes an elongated drive shaft and gear units driven by the drive shaft and coupled to cradle rolls of the adjacent set to provide rotational driving thereof and rotational driving of the conveyor rolls whose ends are supported on the high traction drive elements of the cradle rolls for synchronous driving.

13. A glass sheet heating system comprising: a furnace including a housing having upper and lower housing portions defining a heating chamber; said housing including laterally spaced side walls having associated roll contacting seals; each roll contacting seal including a pair of rigid refractory seal holders and a pair of soft blanket seals made of refractory fibers and positioned by the seal holders; a pair of vertical plates located externally of the furnace on opposite sides thereof; a cradled roll conveyor including conveying rolls that extend laterally through the heating chamber and have ends projecting outwardly from the housing through the roll seals of the side walls with the blanket seals of the roll seals directly engaging the rolls adjacent the ends thereof to prevent heat loss from the furnace; said conveyor roll ends having central end bumpers engaged with the pair of vertical plates to prevent lateral movement of the conveyor rolls; said cradled roll conveyor also including sets of cradle rolls rotatably mounted on the vertical plates at the opposite sides of the furnace; said cradle rolls having high traction drive elements and cooperating in pairs to rotatably support the ends of the conveyor rolls in planarity with each other for conveyance of glass sheets; a drive mechanism that is located on one side of the furnace and includes an elongated drive shaft and gear units mounted on the adjacent vertical plate and driven by the drive shaft; and shafts that couple the gear units to alternate cradle rolls of the adjacent set to provide rotational driving thereof and rotational driving of the conveyor rolls whose ends are supported on the high traction drive elements of the cradle rolls for synchronous driving.

14. A glass sheet heating system comprising; a furnace including a housing having upper and lower housing portions defining a heating chamber; said housing including laterally spaced side walls having associated roll contacting seals; each roll contacting seal including a pair of rigid refractory seal holders and a pair of soft blanket seals made of refractory fibers and positioned by the seal holders; a pair of vertical plates located externally of the furnace on opposite sides thereof; a cradled roll conveyor including conveying rolls that extend laterally through the heating chamber and have ends projecting outwardly from the housing through the roll seals of the side walls with the blanket seals of the roll seals directly engaging the rolls adjacent the ends thereof to prevent heat loss from the furnace; said conveyor roll ends having central end bumpers engaged with the pair of vertical plates to prevent lateral movement of the conveyor rolls; said cradled roll conveyor also including sets of cradle rolls; shafts and antifriction bearings that rotatably mount the cradle rolls on the vertical plates at the opposite sides of the furnace; said cradle rolls having high traction drive elements and cooperating in pairs to rotatably support the ends of the conveyor rolls in planarity with each other for conveyance of glass sheets; a drive mechanism that is located on one side of the furnace and includes an elongated drive shaft and gear units mounted on the adjacent vertical plate and driven by the drive shaft; and shaft extensions that couple the gear units to alternate cradle rolls of the adjacent set to provide rotational driving thereof and rotational driving of the conveyor rolls whose ends are supported on the high traction drive elements of the cradle rolls for synchronous driving.

* * * * *

UNITED STATES PATENT AND TRADEMARK OFFICE
CERTIFICATE OF CORRECTION

PATENT NO. : 4,725,300

DATED : February 16, 1988

INVENTOR(S) : Ronald A. McMaster

It is certified that error appears in the above-identified patent and that said Letters Patent is hereby corrected as shown below:    Title page:

Abstract page, line 11, "othe" should be --other--;

Column 1, line 35, "furnances" should be --furnaces--;

Column 6, line 28, after "24", insert --and 26 have roll contacting seals 58 adjacent the--.

Signed and Sealed this

Thirteenth Day of December, 1988

Attest:

DONALD J. QUIGG

Attesting Officer

Commissioner of Patents and Trademarks